(12) United States Patent
Lee et al.

(10) Patent No.: US 10,347,243 B2
(45) Date of Patent: Jul. 9, 2019

(54) APPARATUS AND METHOD FOR ANALYZING UTTERANCE MEANING

(71) Applicant: Hyundai Motor Company, Seoul (KR)

(72) Inventors: Jia Lee, Uiwang-si (KR); Jimin Han, Anyang-si (KR); Jung Mi Park, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 7 days.

(21) Appl. No.: 15/377,847

(22) Filed: Dec. 13, 2016

(65) Prior Publication Data

US 2018/0096680 A1   Apr. 5, 2018

(30) Foreign Application Priority Data

Oct. 5, 2016 (KR) .................. 10-2016-0128635

(51) Int. Cl.
| | |
|---|---|
| *G10L 15/18* | (2013.01) |
| *G10L 15/02* | (2006.01) |
| *G10L 15/22* | (2006.01) |
| *G10L 15/08* | (2006.01) |

(52) U.S. Cl.
CPC .......... *G10L 15/1815* (2013.01); *G10L 15/02* (2013.01); *G10L 15/22* (2013.01); *G10L 2015/088* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 5,625,748 | A * | 4/1997 | McDonough | G10L 15/1822 704/236 |
| 6,411,683 | B1 * | 6/2002 | Goldberg | H04M 3/2281 379/88.01 |
| 7,472,020 | B2 * | 12/2008 | Brulle-Drews | G01C 21/3629 701/428 |
| 9,064,494 | B2 * | 6/2015 | Holtel | G10L 15/22 |
| 9,324,323 | B1 * | 4/2016 | Bikel | G10L 15/197 |
| 2002/0082833 | A1 * | 6/2002 | Marasek | G10L 15/08 704/251 |
| 2003/0066067 | A1 | 4/2003 | Gutta et al. | |
| 2003/0182131 | A1 * | 9/2003 | Arnold | G10L 15/32 704/275 |
| 2005/0010411 | A1 * | 1/2005 | Rigazio | G10L 17/00 704/246 |
| 2005/0165607 | A1 * | 7/2005 | Di Fabbrizio | G06F 17/2785 704/256 |
| 2005/0283475 | A1 * | 12/2005 | Beranek | |

(Continued)

FOREIGN PATENT DOCUMENTS

| | | |
|---|---|---|
| JP | 2015156099 A | 8/2015 |
| KR | 20040041630 A | 5/2004 |

(Continued)

*Primary Examiner* — Jialong He
(74) *Attorney, Agent, or Firm* — Slater Matsil, LLP

(57) ABSTRACT

Disclosed herein is a method for analyzing an utterance meaning. The method includes collecting a voice signal of an utterer; converting the collected voice signal into information in a text form, extracting a keyword of the text information from the text information, and deriving at least one utterance topic on the basis of the extracted keywords of the text information.

26 Claims, 8 Drawing Sheets

(56) References Cited

U.S. PATENT DOCUMENTS

| | | | |
|---|---|---|---|
| 2007/0078708 A1* | 4/2007 | Yu | G06Q 30/02 705/14.69 |
| 2007/0106747 A1* | 5/2007 | Singh | G06F 17/30663 709/217 |
| 2007/0198248 A1* | 8/2007 | Yasutaka | G10L 15/1822 704/9 |
| 2008/0071536 A1* | 3/2008 | Nagashima | G10L 15/32 704/246 |
| 2011/0040767 A1* | 2/2011 | Kunjithapatham | G06F 16/90328 707/749 |
| 2011/0144999 A1* | 6/2011 | Jang | G06K 9/00892 704/270.1 |
| 2011/0231379 A1 | 9/2011 | Kruglick | |
| 2012/0232893 A1* | 9/2012 | Lee | G10L 15/30 704/231 |
| 2013/0018895 A1* | 1/2013 | Harless | G10L 15/1822 707/748 |
| 2015/0095032 A1* | 4/2015 | Li | G10L 15/083 704/255 |
| 2015/0194153 A1 | 7/2015 | Lee et al. | |
| 2015/0332168 A1* | 11/2015 | Bhagwat | G06F 3/0481 706/12 |
| 2016/0104484 A1* | 4/2016 | Chakladar | G10L 15/22 704/235 |
| 2016/0163314 A1* | 6/2016 | Fujii | G10L 15/1822 704/275 |
| 2017/0060994 A1* | 3/2017 | Byron | G06F 17/30684 |
| 2017/0076724 A1* | 3/2017 | Park | G10L 15/063 |

FOREIGN PATENT DOCUMENTS

| | | |
|---|---|---|
| KR | 100881334 B1 | 2/2009 |
| KR | 20120085865 A | 8/2012 |
| KR | 20150032147 A | 3/2015 |
| KR | 1020150081981 A | 7/2015 |
| KR | 101560456 B1 | 10/2015 |

* cited by examiner

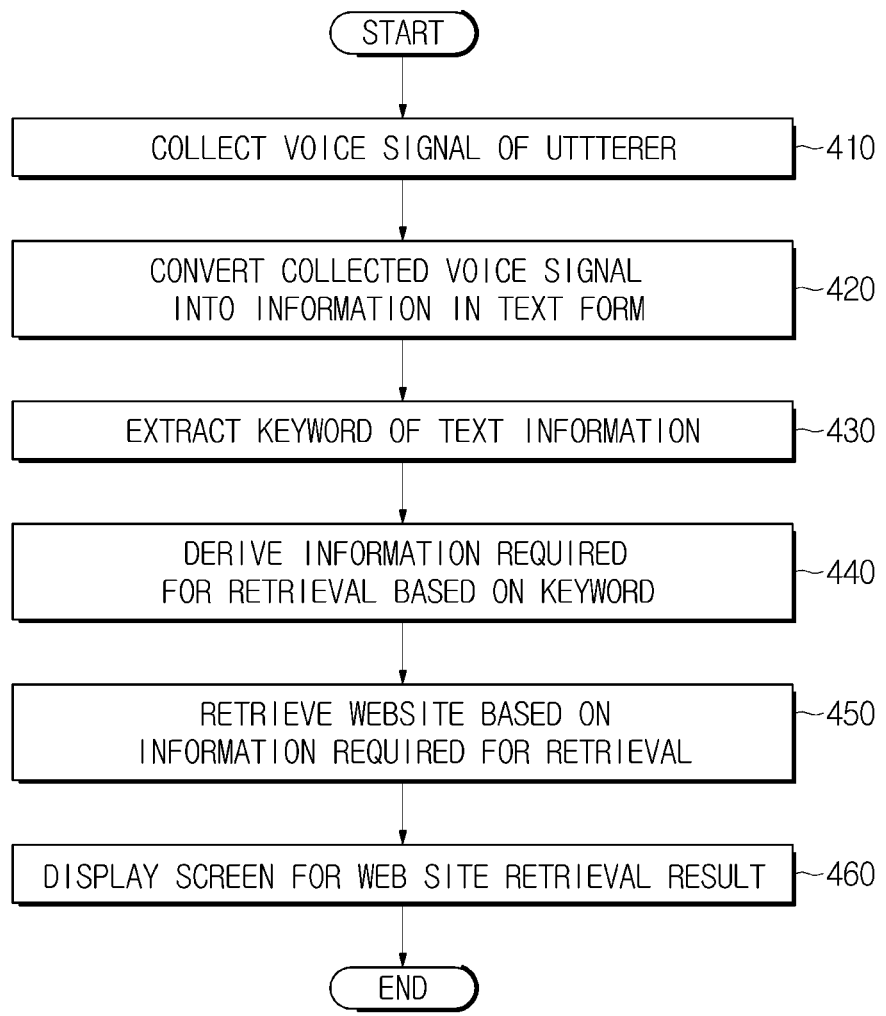

APPARATUS AND METHOD FOR ANALYZING UTTERANCE MEANING

CROSS-REFERENCE TO RELATED APPLICATIONS

This application claims the benefit of Korean Patent Application No. 10-2016-0128635, filed on Oct. 5, 2016 in the Korean Intellectual Property Office, the disclosure of which is incorporated herein by reference.

TECHNICAL FIELD

Embodiments of the present disclosure relate to an apparatus and method for analyzing an utterance meaning.

BACKGROUND

Technologies for processing an utterance meaning are intelligent technologies for finding and presenting a proper response using an utterance meaning of an utterer. Technologies are under study for finding intent of an utterer which is hidden in each utterance for making a proper response to a system to realize this technology for processing an utterance meaning. The technologies under study of late include a conference support device disclosed in Japanese Unexamined Patent Application Publication No. 2015-156066, a device for structuralizing conference discussion disclosed in Korean Unexamined Patent Application Publication No. 2015-0081981, a method of extracting and predicting information about a trend disclosed in Korean Patent No. 10-1560459, a device and method for servicing interactive information disclosed in Korean Patent No. 10-00881334, and so on.

The technology for processing an utterance meaning can be applied to various environments such as an interview, a conference, a dialogue, and so on.

SUMMARY

Therefore, it is an aspect of the present disclosure to provide an apparatus and method for analyzing an utterance meaning, which are provided to derive a topic of the utterance meaning based on a keyword of text information.

It is an aspect of the present disclosure to provide an apparatus and method for analyzing an utterance meaning which are provided to analyze the utterance meaning based on a keyword of text information within a range of topics of the utterance meaning.

Additional aspects of the disclosure will be set forth in part in the description which follows and, in part, will be obvious from the description, or may be learned by practice of the disclosure.

In accordance with an aspect of the present disclosure, a method for analyzing an utterance meaning includes the steps of: collecting a voice signal of an utterer; converting the collected voice signal into information in a text form; extracting keywords of the text information from the text information; and deriving at least one utterance topic on the basis of the extracted keywords of the text information.

Here, the step of deriving at least one utterance topic may include deriving an utterance topic on the basis of the keywords of the text information emerging at a preset reference value or higher among keywords of the converted text information.

Further, the step of deriving at least one utterance topic may include deriving at least one selected, by a user, from the utterance topics derived on the basis of the keywords, as the utterance topic.

Further, the step of deriving at least one utterance topic may include deriving an utterance topic on the basis of a correlation between the extracted keywords.

Further, the step of deriving at least one utterance topic may include deriving an utterance topic on the basis of information about the utterer.

Further, when there are a plurality of utterers, the step of deriving at least one utterance topic may include deriving an utterance topic on the basis of common information about the utterers.

Further, the step of deriving at least one utterance topic may include deriving an utterance topic on the basis of the keywords of the converted text information within a range of preset topic keywords.

Further, the step of deriving at least one utterance topic may include deriving a detailed utterance topic within a range of the derived utterance topic.

Further, the step of deriving at least one utterance topic may include deriving an utterance topic selected at a preset reference value or higher on the basis of a history of selecting the utterance topic as the utterance topic of the utterer.

Further, the step of deriving at least one utterance topic may include extracting information about at least one of utterance intent, purpose, and target of the utterer on the basis of the extracted keyword of the text information, and deriving an utterance topic on the basis of the extracted information.

Further, the method may further include a step of analyzing the utterance meaning on the basis of the derived utterance topic.

Further, the step of analyzing the utterance meaning may include performing retrieval within a range of the derived utterance topics with the extracted keyword of the text information, and displaying a result of the retrieval.

Further, the step of deriving at least one utterance topic may include deriving an utterance topic of the converted text information within a range of preset topic keywords, and deriving a detailed utterance topic within a range of the derived utterance topics; and the step of analyzing the utterance meaning may include displaying a result of analyzing the utterance meaning according to the detailed utterance topic.

Further, the step of deriving at least one utterance topic may include deriving an utterance topic on the basis of a result of analyzing the utterance meaning.

In accordance with an aspect of the present disclosure, an apparatus for analyzing an utterance meaning includes: a collection unit configured to collect a voice signal of an utterer; a control unit configured to convert the voice signal into information in a text from and derive an utterance topic of the utterer on the basis of keywords of the text information; and a display unit configured to display the derived utterance topic.

Here, the control unit may derive an utterance topic on the basis of the keywords of the text information output above a preset reference value among the keywords of the text information.

Further, the control unit may derive at least one selected, by a user, from the utterance topics derived on the basis of the keywords, as the utterance topic.

Further, the control unit may derive the utterance topic on the basis of a correlation between the extracted keywords.

Further, the control unit may derive an utterance topic on the basis of information about the utterer.

Further, when there are a plurality of utterers, the control unit may derive an utterance topic on the basis of common information about the utterers.

Further, the control unit may derive an utterance topic within a range of preset topic keywords on the basis of the keywords of the text information.

Further, the control unit may derive a detailed utterance topic within a range of the derived utterance topics.

Further, the control unit may analyze the utterance meaning of the utterer on the basis of the detailed utterance topic; and the display unit may display a result of analyzing the utterance meaning according to the detailed utterance topic.

Further, the control unit may derive, as the utterance topic of the utterer, an utterance topic selected at a preset reference value or higher on the basis of a history of selecting the utterance topics.

Further, the control unit may extract information about at least one of utterance intent, purpose, and target of the utterer on the basis of the keywords, and derives an utterance topic on the basis of the extracted information.

Further, the control unit may analyze the utterance meaning on the basis of the derived utterance topic.

Further, the control unit may perform retrieval within a range of the derived utterance topics with the keywords of the text information; and the display unit may display a result of the retrieval.

Further, the control unit may derive the utterance topic on the basis of a result of analyzing the utterance meaning.

In addition, the display unit may be disposed to enable the utterer to check display contents of the display unit.

According to the apparatus and method for analyzing an utterance meaning according to an aspect of the present disclosure, the utterance meaning can be efficiently arranged without converting the utterance meaning in a text form.

According to the apparatus and method for analyzing an utterance meaning according to another aspect of the present disclosure, a result of analyzing the utterance meaning can be visualized and provided in various forms.

According to the apparatus and method for analyzing an utterance meaning according to still another aspect of the present disclosure, the utterance meaning can be analyzed in real time, and the topic of the utterance meaning can be derived based on a result of the analysis.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a flow chart illustrating an example of the method for analyzing an utterance meaning in a secretary mode.

DETAILED DESCRIPTION OF ILLUSTRATIVE EMBODIMENTS

Figure 1:
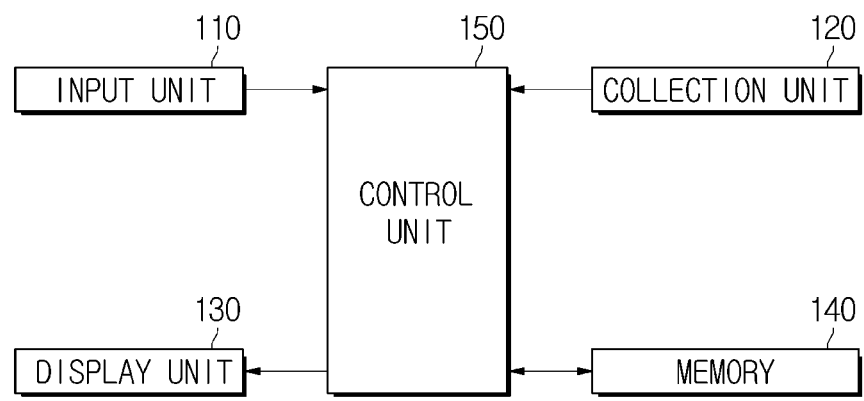
FIG. 1 is a control block diagram illustrating a configuration of an apparatus for analyzing an utterance meaning according to an embodiment.

Reference will now be made in detail to the embodiments of the present disclosure, examples of which are illustrated in the accompanying drawings, wherein like reference numerals refer to like elements throughout.

The present disclosure relates to an apparatus and method for analyzing an utterance meaning.

An apparatus and method for analyzing an utterance meaning according to an aspect can derive an utterance topic of an utterer based on an input voice signal of the utterer and analyze the utterance meaning. To be specific, the apparatus and method for analyzing an utterance meaning can be provided as a tool for analyzing the utterance meaning of a single utterer or a dialogue meaning between a plurality of utterers. For example, a meaning of a real-time interview or a meaning of a real-time conference can be analyzed using the apparatus and method for analyzing an utterance meaning.

This apparatus for analyzing an utterance meaning can be realized through a device, such as a desktop computer, a smart phone, a tablet PC, and so on, which can collect and process a voice signal of an utterer and display the results.

Hereinafter, the apparatus and method for analyzing an utterance meaning will be described in detail with reference to the accompanying drawings.

FIG. 1 is a control block diagram illustrating a configuration of an apparatus 100 for analyzing an utterance meaning according to an embodiment.

Referring to FIG. 1, an apparatus 100 for analyzing an utterance meaning according to an embodiment may include an input unit no, a collection unit 120, a display unit 130, a memory 140, and a control unit 150.

The input unit no may receive a control instruction which a user inputs for the apparatus 100 for analyzing an utterance meaning. A user can set a mode of analyzing the utterance meaning through the input unit 110. Here, the mode of analyzing the utterance meaning may include an interview mode, an idea mode, a secretary mode, and so on. Hereinafter, the interview mode is defined as a mode of analyzing a topic and meaning of an interview based on utterance information intended for the interview. The idea mode is defined as a mode of analyzing a topic and meaning of a conference based on the utterance meaning of conference participants in the middle of the conference. The secretary mode is defined as a mode of providing a function of retrieving an inquiry meaning based on utterance information generated in the middle of a conference.

The input unit no may include a hardware input device such as various buttons or switches, a keyboard, a mouse, a track-ball, etc. for input of a user, and a graphic user interface (GUI) such as a touch pad, that is a software input device. When the input unit no is provided in the form of a touch pad, the touch pad may be realized as a touch screen panel (TSP) and form a layered structure with the display unit 130.

The collection unit 120 may collect a voice signal of an utterer and output the collected voice signal to the control unit 150.

The collection unit 120 may include a voice sensor that collects voice signals of a general audio frequency band. For example, the collection unit 120 may adopt at least one voice sensor selected from the group consisting of a microphone, a piezoelectric sensor, and an acoustic differential sensor, but the example of the adoptable voice sensor is not limited thereto.

The display unit 130 may be disposed such that an utterer can confirm display content thereof. As an example, when a plurality of utterers are in a conference, the display unit 130 may be provided at the center of a conference room in a screen form. The display unit 130 may be disposed such that a plurality of utterers can confirm the display content thereof. In this case, a plurality of display units 130 may be provided as needed.

The display unit 130 may display a screen for a result of analyzing the voice signal collected by the collection unit 120. To be more specific, when the voice signal collected by the collection unit 120 is converted into information in a text form, the display unit 130 may display the converted text information or display that the text information is being processed, in a form of an image, a moving picture, or the like, as needed.

When an utterance topic of an utterer is derived based on keywords of the text information, the display unit 130 may include information about the derived utterance topic. At this point, when a single utterance topic is derived, the display unit 130 may display the single utterance topic. When a plurality of utterance topics are derived, the display unit 130 may display the plurality of utterance topics. In addition, when the utterance topic is changed in time, the display unit 130 may alter and display the utterance topic with the lapse of time. In this case, the display unit 130 may also display a history of the utterance topic at one side of the screen.

When detailed utterance topics are derived according to a mode set by a user, together with a focus on a main utterance topic, the display unit 130 may display information about the detailed utterance topics.

The display unit 130 may display a result of analyzing the utterance meaning in a form of a text, an image, a moving picture, or the like.

For example, the apparatus 100 for analyzing an utterance meaning may analyzed the utterance meaning of the utterer by performing retrieval using the text information within an utterance topic range. In this case, the display unit 130 may display a retrieval result screen, in which a text and an image are combined.

According to another example, the apparatus 100 for analyzing an utterance meaning may derive the detailed utterance topics according to the mode set by the user and classify the utterance meaning of the utterer according to the derived detailed utterance topics. In this case, the display unit 130 may display the detailed utterance topics with a focus on the utterance topic, and classify the detailed utterance topics to display content related to the utterance meaning of the utterer. This display method can be useful when a tree of ideas of conference participants is formed in the middle of a brainstorming conference.

The memory 140 may store a program or an application for driving and controlling the apparatus 100 for analyzing an utterance meaning.

To be more specific, the memory 140 may store a program or the like for converting the analog voice signal collected through the collection unit 120 into a digital voice signal and converting the digital voice signal into information in a text form.

Further, the memory 140 may store a program or the like for extracting a keyword from the text information, deriving the utterance topic of the utterer based on the extracted keyword, and analyzing the utterance meaning based on the derived utterance topic.

The memory 140 may store a user interface (UI) related to a control program or application for controlling the apparatus 100 for analyzing an utterance meaning, an object (for instance, an image, a text, an icon, a button, etc.) for providing the UI, information about a user, a document, a database, or relevant data.

The memory 140 may include at least one type of storage medium of a flash memory type, a hard disk type, a multimedia card micro type, a card type (for instance, a secure digital (SD) memory card or an extreme digital (XD) memory card), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The control unit 150 controls the overall operation of the apparatus 100 for analyzing an utterance meaning. The control unit 150 may control components of the apparatus 100 for analyzing an utterance meaning, namely the input unit 110, the display unit 130, the collection unit 120, and the memory 140. The control unit 150 may be one of various processors including at least one chip in which an integrated circuit is formed.

The control unit 150 may convert the voice signal collected by the collection unit 120 into information in a text form and extract keywords from the converted text information.

In this case, the control unit 150 may extract the keywords of the text information centered on a preset keyword such as a noun, an adjective, a verb, or the like and excluding preset keywords including inflectional word endings such as "s," "ed," and "ing" among the keywords of the text information emerging at a preset reference value or higher. Since there is a high probability of an inflectional word ending, a preposition, etc. being extracted as frequent keywords in the utterance meaning of the utterer, more meaningful keywords can be set to be extracted through this process.

The control unit 150 may derive the utterance topic based on the extracted keyword. To be more specific, the control unit 150 may extract information about at least one of utterance intent, purpose, and target of an utterer based on the extracted keyword, and derive an utterance topic based on the extracted information. Here, the keywords provided in deriving the utterance topic may be the keywords of the text information emerging at a preset reference value or higher among the extracted keywords.

Meanwhile, a plurality of utterance topics may be derived as needed. In this case, as the uttering of the utterer proceeds, the control unit 150 may reduce the range of the utterance topic, based on a correlation between the extracted keywords.

For example, when keywords such as a white cabbage, a shallot, a radish, a salted seafood, a salt, a red pepper, and so on emerge at a preset reference value or higher in the process of deriving the utterance topic, the utterance topics such as a method of making shallot kimchi from shallots and white cabbages, a method of making diced radish kimchi from radishes, a method of making cabbage kimchi from white cabbages, and so one may be derived based on these keywords.

In this case, as uttering proceeds, the range of the utterance topics can be reduced, based on a correlation between the extracted keywords. For example, keywords such as radish, shallot, salted seafood, and salt has a correlation in terms of being materials for making diced radish kimchi from radishes, the utterance topic can be reduced to the method of making diced radish kimchi from radishes on the basis of the correlation between these words.

The derived utterance topic may be displaced on the display unit 130 under the control of the control unit 150. When a plurality of utterance topics are derived, the display unit 130 may display a list of the utterance topics. In this case, the display unit 130 may display an item of the utterance topic having a high probability of being derived as an utterance topic at the top end, in a size larger than other items, or in another calligraphic style. However, an utterance topic displaying method of the display unit 130 is not limited to the aforementioned example.

Meanwhile, it goes without saying that the control unit 150 can derive at least one selected from the plurality of utterance topics by a user as the utterance topic and control the display of the display unit 130 to display the derived utterance topic.

Further, the control unit 150 may derive a detailed utterance topic from within the range of the derived utterance topics. A method of deriving the detailed utterance topic is similar to the aforementioned method of deriving the utterance topic, and description overlapping that of the method of deriving the utterance topic will be omitted below. When the detailed utterance topic is derived from within the range of the derived utterance topics, the control unit 150 may produce a new tree according to the detailed utterance topic. The display unit 130 may display content corresponding to the utterance meaning on a tree in order of utterance.

Further, the control unit 150 may derive the utterance topic on the basis of information about an utterer. When there are a plurality of utterers, the control unit 150 may derive the utterance topic on the basis of common information about the utterers as needed.

According to an example, the control unit 150 may derive the utterance topic based on gender, age, occupation, etc. of the utterer. Alternatively, the control unit 150 may derive the utterance topic based on personal information about a social network service (SNS) account, an e-mail, or the like.

According to another example, the control unit 150 may derive the utterance topic based on gender, age, occupation, etc. of each of the plurality of dialogue anticipants. Alternatively, the control unit 150 may derive the utterance topic based on personal information about social network service (SNS) accounts, e-mails, or the like of the plurality of dialogue anticipants. If necessary, the control unit 150 may extract a common interest of the plurality of dialogue anticipants on the basis of information about the plurality of dialogue anticipants and derive a recommendable utterance topic based on the extracted interest.

Further, the control unit 150 may derive the utterance topic based on the keywords of the text information within a range of a preset topic keyword. Here, the preset topic keyword may be a "keyword related to the field of the utterance topic" preset by a user or a keyword related to the field of a specific utterance topic as needed. Here, the field of the utterance topic may refer to a term including a range or a portion of the topic divided into several parts, for instance a range of topics divided into several parts such as electronics, telecommunication, automobiles, and so on. Further, the keyword of the utterance topic may refer to a term related to a more detailed topic set by a user. The control unit 150 can enhance accuracy in the process of deriving the utterance topic by deriving the utterance topic from within the range of the preset topic keywords, as described above.

Further, the control unit 150 may derive the utterance topic selected at a preset reference value or higher on the basis of a selected history of the utterance topic as the utterance topic of the utterer. According to an example, a plurality of utterance topics may be derived in the process in which the utterance topics of the utterer are derived on the basis of the keywords of the text information. In this case, one topic selected by a user may be derived as the utterance topic. In this case, in a process of reselecting the utterance topic during proceeding with uttering, the utterance topic selected by the utterer may be provided as the selected history of the utterance topic.

Further, the control unit 150 may analyze the utterance meaning based on the derived utterance topic and provide the result of analyzing the utterance meaning for the process of deriving the utterance topic as needed. In addition, the control unit 150 may control the display unit 130 to display the result of analyzing the utterance meaning.

According to an example, the control unit 150 may control the display unit 130 to retrieve a web site from within the range of the derived utterance topics with the keywords of the extracted text information and to display a result of the retrieval. The display unit 130 may display a screen for the result of retrieving the web site. At this point, the result screen may be displayed in the form of a text or an image, or a combination thereof, as needed.

The configuration of the apparatus 100 for analyzing an utterance meaning according to the embodiment has been described. Next, a method for analyzing an utterance meaning according to an embodiment will be described.

Figure 2:
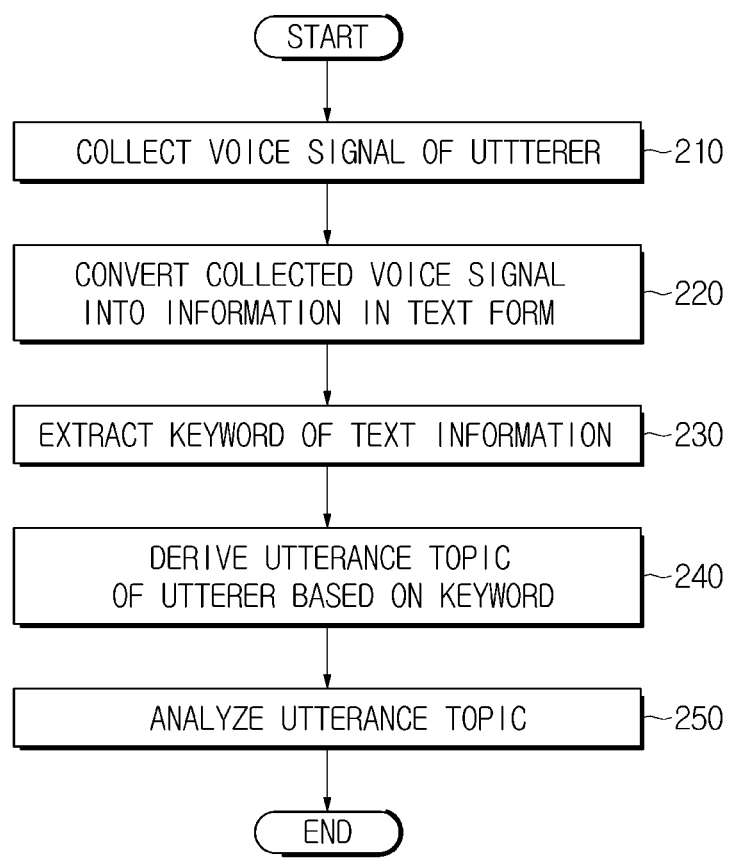
FIG. 2 is a flow chart illustrating a flow of a method for analyzing an utterance meaning according to an embodiment.

FIG. 2 is a flow chart illustrating a flow of a method for analyzing an utterance meaning according to an embodiment. Referring to FIG. 2, a method for analyzing an utterance meaning according to an embodiment may include a step of collecting a voice signal of an utterer (S210), a step of converting the collected voice signal into information in a text form (S220), a step of extracting keywords of the text information (S230), a step of deriving an utterance topic of the utterer based on the keyword (S240), and a step of analyzing the utterance meaning based on the derived utterance topic.

Hereinafter, for convenience of description, description overlapping that of the configuration of the control unit 150 in connection with the step of collecting a voice signal of an utterer (S210) and the step of converting the collected voice signal into information in a text form (S220) will be omitted.

The step of extracting keywords of the text information (S230) may include extracting words emerging at a preset reference value or higher from the text information as the keywords of the text information.

The step of deriving an utterance topic of the utterer may include extracting information about at least one of utterance intent, purpose, and target of an utterer based on the extracted keyword of the text information, and deriving the utterance topic based on the extracted information. Here, the keywords provided in deriving the utterance topic may be the keywords of the text information emerging at a preset reference value or higher among the extracted keywords.

The step of deriving an utterance topic of the utterer may include reducing the range of the utterance topics based on a correlation between the extracted keywords as the uttering of the utterer proceeds, when a plurality of utterance topics are derived. However, the process of deriving the utterance topic is not limited thereto. At least one selected from the plurality of utterance topics may be derived as the utterance topic by a user.

Further, the step of deriving an utterance topic may include extracting the utterance topic based on the keywords of the text information analyzed within a range of preset topic keywords. At this point, it goes without saying that a detailed utterance topic can be derived from within a range of the derived utterance topics.

Further, the step of deriving an utterance topic may include deriving the utterance topic on the basis of information about the utterer. Alternatively, when there are a plurality of utterers, the step of deriving an utterance topic may include deriving the utterance topic on the basis of common information about the utterers.

Further, the step of deriving an utterance topic may include deriving, as the utterance topic, an utterance topic selected at a preset reference value or higher on the basis of a history of selecting the utterance topic.

Hereinafter, with regard to the specific example related to the method of deriving the utterance topic, description overlapping that of the control unit 150 of the apparatus 100 for analyzing an utterance meaning will be omitted (S240).

When the utterance topic is derived, a step of analyzing the utterance meaning based on the derived utterance topic may be carried out, and a result of analyzing the utterance meaning may be provided for the process of deriving the utterance topic as needed (S250).

The step of analyzing the utterance meaning may include retrieving a website with a keyword from within a range of the derived utterance topics, and displaying a result of retrieving the web site on the display unit 130. Alternatively, the step of displaying a result of retrieving the web site on the display unit 130 may be performed independently of the step of analyzing the utterance meaning. The display unit 130 may display a screen for the result of retrieving the web site under control of the control unit 150. At this point, the screen for the result of retrieving the website may be displayed in the form of a text or an image or a combination thereof.

The method for analyzing an utterance meaning according to the embodiment has been described.

Hereinafter, a detailed embodiment of the method for analyzing an utterance meaning according to a mode of analyzing the utterance meaning will be described in detail. The mode of analyzing the utterance meaning may include an idea mode, a secretary mode, an interview mode, or the like as described above. While the mode of analyzing the utterance meaning is not limited. Hereinafter, for convenience of description, a process of analyzing the utterance meaning will be described in detail by giving the aforementioned modes as examples.

Figure 3:
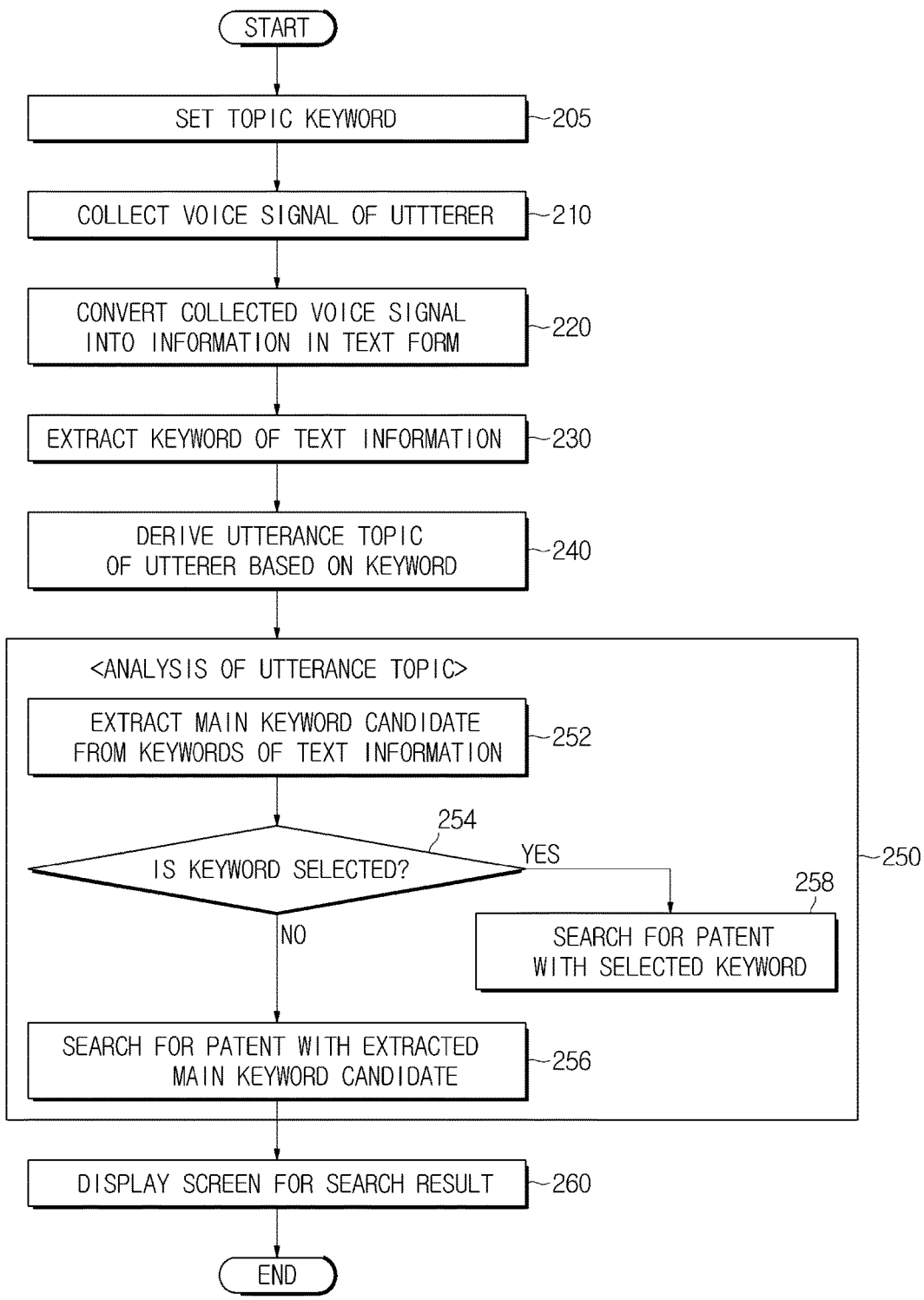
FIG. 3 is a flow chart illustrating an example of the method for analyzing an utterance meaning in an idea mode.

FIG. 3 is a flow chart illustrating an example of the method for analyzing an utterance meaning in the idea mode. In the idea mode described in FIG. 3, a result of searching for a patent for an idea discussed in a conference process may be provided in real time. In addition, the result of searching for a patent may be provided for the process of deriving the utterance topic of the utterance meaning in the idea mode.

Referring to FIG. 3, a step of setting a topic keyword in the idea mode is proceeded (S205), and then a step of collecting a voice signal (S210), a step of converting the collected voice signal into information in a text form (S220), a step of extracting keywords of the text information (S230), a step of deriving an utterance topic of an utterer based on the keywords (S240), a step of analyzing the utterance topic (S250), and a step of displaying a screen for a search result (S260) may be performed.

Here, the step of setting a topic keyword may include setting the topic keyword within a range of preset topic keywords. The preset topic keywords may be "keywords related to a field of the utterance topic" preset by a user. For example, the keyword related to a field of the utterance topic may include a keyword such as "electronics," "telecommunication," or "automobile," but an example of the topic keyword is not limited thereto (S205).

When the topic keyword is set, the step of deriving an utterance topic through the step of collecting a voice signal may be performed. Here, the step of deriving an utterance topic may include deriving the utterance topic on the basis of keywords emerging at a preset reference value or higher among keywords extracted from the text information (S210 to S240).

For example, a "possibility of registering patent A," "configuration A-1," or "configuration A-2" may be extracted through the step of collecting a voice signal after the topic keyword is set as "telecommunication." The control unit 150 may derive the utterance topic within a range of the "telecommunication" field on the basis of the keywords emerging at a preset reference value or higher among the keywords derived from the text information. That is, when it is determined that keywords such as the "possibility of registering patent A," the "configuration A-1," and the "configuration A-2" are uttered as being above a preset reference value, an utterance topic such as "pursuing the possibility of registering patent A" in the range of the "telecommunication" field may be derived based on the keywords under interest. Alternatively, the control unit 150 may derive the utterance topic by giving a weighted value to a high frequency keyword among the plurality of keywords.

Hereinafter, with regard to the process of deriving the utterance topic, description overlapping the foregoing will be omitted.

When the utterance topic is derived, the step of analyzing the utterance topic (S250) may be performed. The step of analyzing the utterance topic may include extracting main keyword candidates from the keywords of the text information (S252), and making a search for a patent with the keyword selected from the extracted main keyword candidates (S254 and S258). At this point, a history of selecting the keyword may be stored in the memory 140 and be provided for a process of deriving the utterance topic of the utterer later.

Meanwhile, when no keyword is selected from the main keyword candidates, the search for the patent may be made with the main keyword candidates (S254 and S256).

For example, when the "pursuing the possibility of registering patent A" is selected as the utterance topic, some of the keywords provided in selecting the utterance topic may be extracted as the main keyword candidates. The high frequency keywords may be generally extracted as the main keyword candidates, but the method of extracting the main keyword candidates is not limited thereto.

For example, keywords such as the "possibility of registering patent A," the "configuration A-1," and the "configuration A-2" which are the keywords provided for selecting the utterance topic may be extracted as the main keyword candidates. In this case, when the keywords such as the "configuration A-1" and the "configuration A-2" are selected from the extracted main keyword candidates, the search for the patent may be made with the selected keywords, and a screen for a search result may be provided for the display unit 130.

Meanwhile, when neither of the main keyword candidates such as the "possibility of registering patent A," the "configuration A-1," and the "configuration A-2" is selected, the search for the patent may be made using all of the "possibility of registering patent A," the "configuration A-1," and the "configuration A-2" as the keywords.

In the idea conference mode according the aforementioned example, the search for the patent may be made in real time with respect to ideas discussed in an idea conference process, and a user may easily check technologies related to the idea discussed in the conference.

Figure 4:
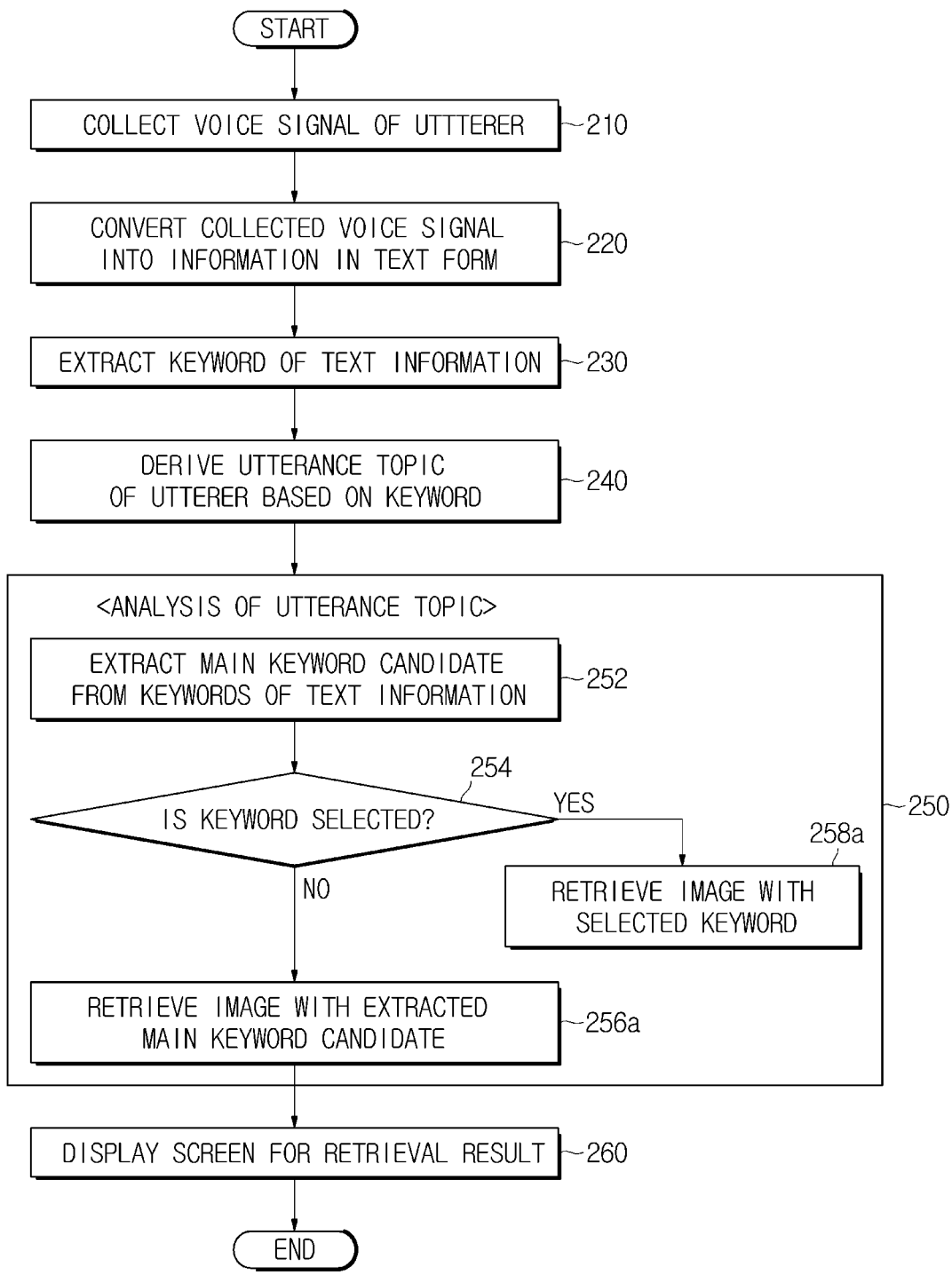
FIG. 4 is a flow chart illustrating another example of the method for analyzing an utterance meaning in the idea mode.

FIG. 4 is a flow chart illustrating another example of the method for analyzing an utterance meaning in the idea mode. In the idea mode described in FIG. 4, a result of making a search for the idea discussed in a conference process may be provided in an image form.

Referring to FIG. 4, the idea mode according to another embodiment may include a step of collecting a voice signal (S210), a step of converting the collected voice signal into information in a text form (S220), a step of extracting keywords from the text information (S230), a step of deriving an utterance topic of an utterer based on the keywords (S240), a step of analyzing the utterance topic (S250), and a step of displaying a screen for a search result (S260).

Alternatively, in the idea mode described in FIG. 4, a step of setting a topic keyword may be included as in the idea mode described in FIG. 3, and contents overlapping the foregoing will be omitted below.

The step of analyzing the utterance topic may include extracting main keyword candidates from the keywords of the text information (S252), and when at least one of the extracted keyword candidates is selected, the step of analyzing the utterance topic may include retrieving an image with the selected keyword (S254 and S258a). At this point, a history of selecting the keyword may be stored in the memory 140 and be provided for the process of deriving the utterance topic of the utterer later.

Meanwhile, when no keyword is selected from the main keyword candidates, the image may be retrieved with the main keyword candidates (S254 and S256a).

Figure 5:
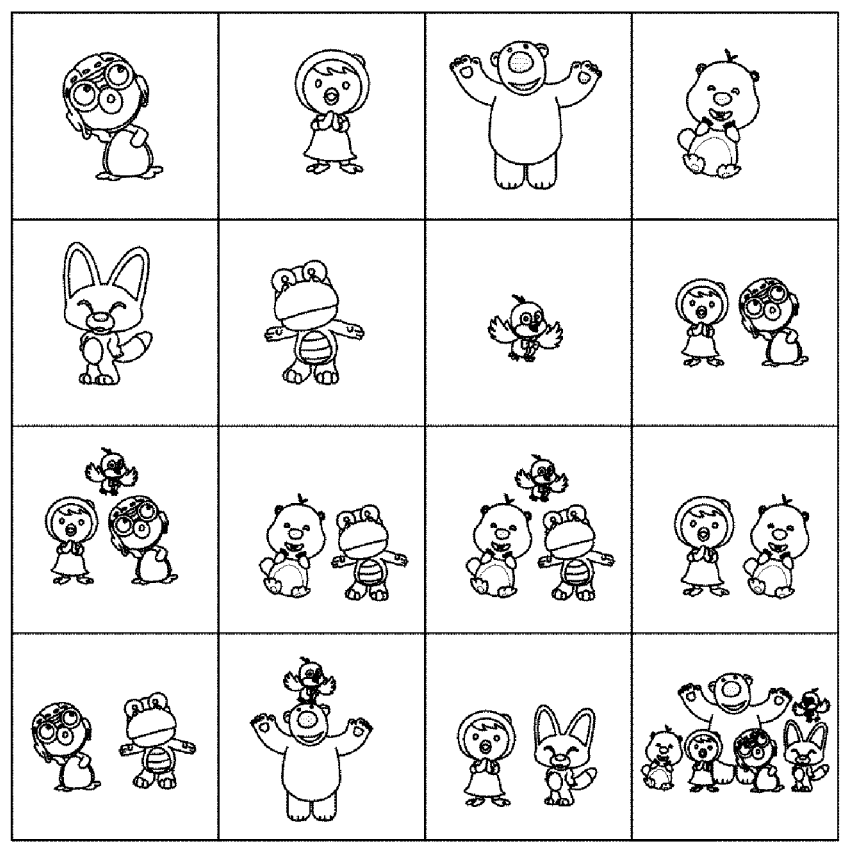
FIG. 5 is a diagram illustrating an example of a screen for a result of retrieving an image in the idea mode described in FIG. 4.

FIG. 5 is a diagram illustrating an example of a screen for the result of retrieving the image in the idea mode described in FIG. 4.

Referring to FIG. 5, the screen for the result of retrieving the image may be provided in a form in which a plurality of images are disposed in a chessboard shape. At this point, shapes and sizes of the displayed images, the number of displayed images, and so on may be set by a user. In addition, the method of providing the images is not limited to the example illustrated in FIG. 5, and the images may be provided in various forms as needed.

Figure 6:
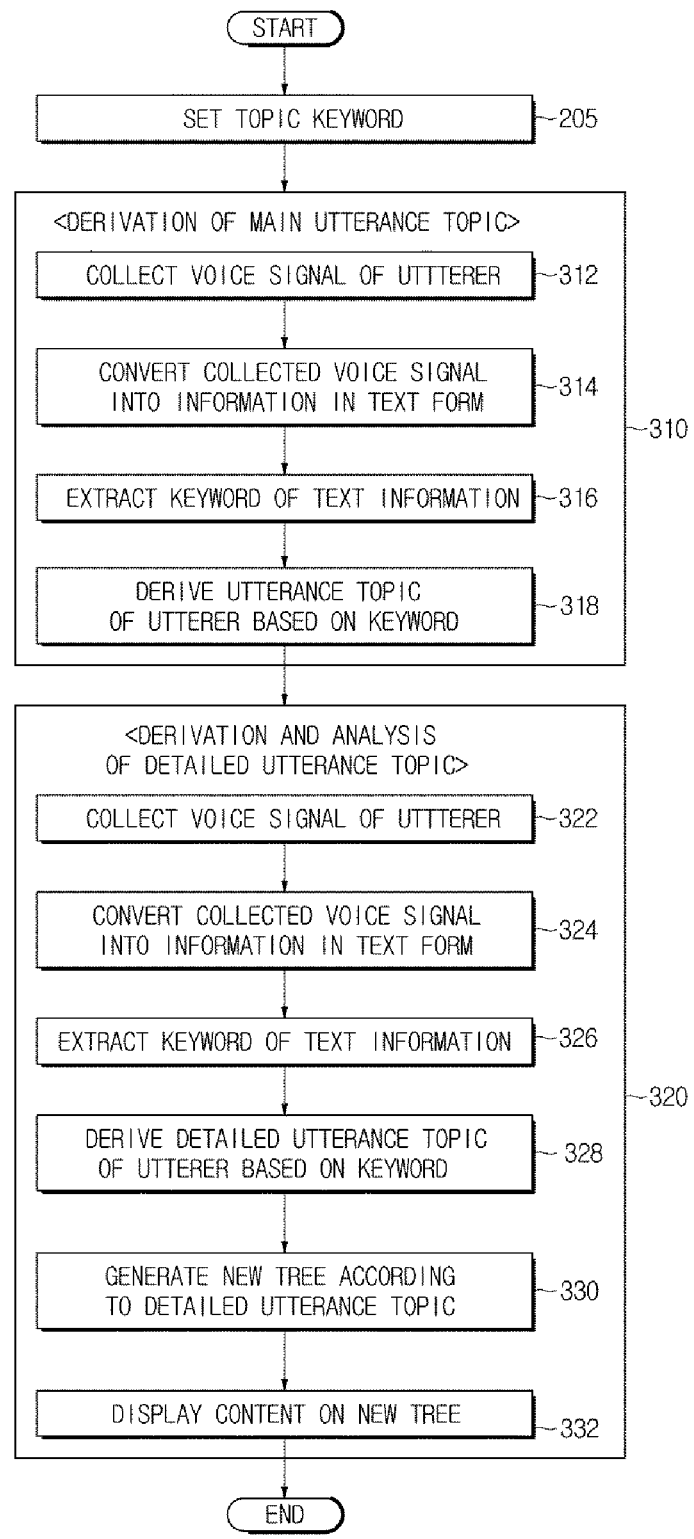
FIG. 6 is a flow chart illustrating still another example of the method for analyzing an utterance meaning in the idea mode.
Figure 7:
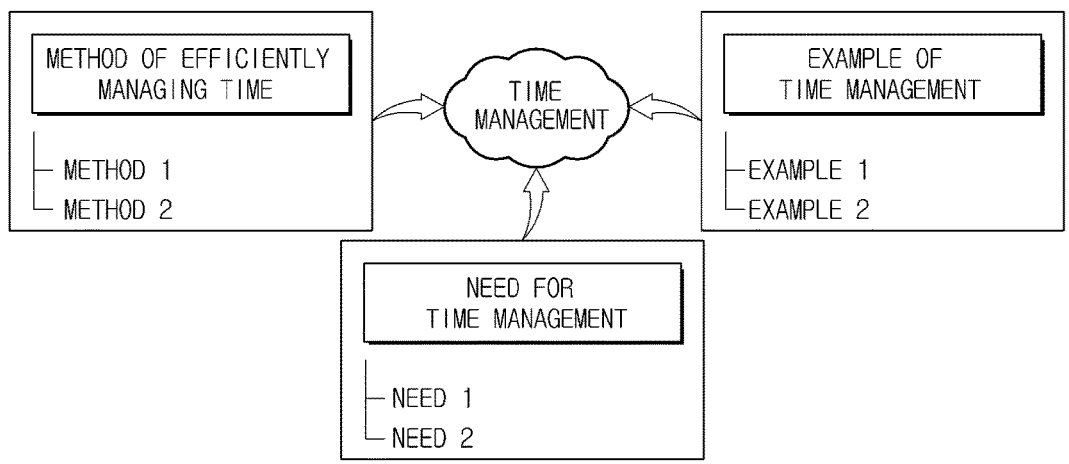
FIG. 7 is a diagram illustrating an example of a screen for a result of analyzing the utterance meaning in the idea mode described in FIG. 6.

FIG. 6 is a flow chart illustrating another example of the method for analyzing an utterance meaning in the idea mode. FIG. 7 is a diagram illustrating an example of a screen for a result of analyzing the utterance meaning in the idea mode described in FIG. 6.

In the idea mode described in FIG. 6, detailed topics related to an idea discussed in an idea conference process may be derived, and discussed ideas may be arranged according to each of the detailed topics and be provided in a tree form, as illustrated in FIG. 7.

Referring to FIG. 6, the idea mode according to the other embodiment may include a step of setting a topic keyword (S205), and a step of deriving a main utterance topic (S310), and a step of deriving and analyzing a detailed utterance topic (S320).

To be more specific, the step of setting a topic keyword may include setting the topic keyword within a range of preset topic keywords. The preset topic keywords may be "keywords related to a specific utterance topic" preset by a user. For example, a keyword such as a "time" may be set as the topic keyword (S205).

When the topic keyword is set, the step of deriving a main utterance topic within a range of the set topic keywords may be performed (S310).

The step of deriving a main utterance topic may include a step of collecting a voice signal (S312), a step of converting the collected voice signal into information in a text form (S314), a step of extracting keywords of the text information (S316), and a step of deriving an utterance topic of an utterer based on the keywords (S318).

For example, when the topic keyword is set like "time," the main utterance topic may be derived within the range of the set topic keywords. When the topic keyword is set as "time," and "efficiency," "supervision," "monitoring," or the like is extracted through a series of processes described above, an utterance topic such as "time management" may be derived based on the extracted keywords.

When the main utterance topic is derived, the step of deriving and analyzing a detailed utterance topic within a range of the derived main utterance topics may be performed (S320).

The step of deriving and analyzing a detailed utterance topic may include collecting a voice signal (S322), converting the collected voice signal into information in a text form (S324), extracting keywords of the text information (S326), deriving a detailed utterance topic of an utterer based on the keyword (S328), generating a new tree according to the detailed utterance topic (S330), and displaying content on the new tree (S332).

For example, when the main utterance topic is derived as "time management," "need for time management," "method of efficiently managing a time," "an example of the time management", or the like may be derived as the detailed utterance topic through a series of processes described above, on the basis of the collected voice signal of the utterer. In this case, the new tree according to the detailed utterance topic may be displayed on the display unit 130, and main content of the utterance meaning may be displayed on the new tree in the order of utterances of the utterer in real time.

That is, in the idea mode according to the present embodiment, the ideas discussed in the idea conference process are arranged and displayed according to the detailed topic so that they can be conveniently arranged.

FIG. 8 is a flow chart illustrating an example of the method for analyzing an utterance meaning in a secretary mode. In the secretary mode described in FIG. 8, a result of retrieving questions discussed in a conference process may be provided in real time.

Referring to FIG. 8, the secretary mode according to an embodiment may include a step of collecting a voice signal (S410), a step of converting the collected voice signal into information in a text form (S420), a step of extracting keywords of the text information (S430), a step of deriving information required for retrieval on the basis of the keywords (S440), a step of retrieving a website on the basis of the information required for retrieval (S450), and a step of displaying a screen for a website retrieval result (S460).

For example, when an utterer utters a sentence such as "what is A described in the paragraph of page " in the conference process, an utterance meaning may be collected by the collection unit 120**. In this case, the collected voice signal may be converted into the information in the text form. Afterwards, the step of extracting a keyword of the text information may be performed. In the present embodiment, the sentence of "what is A" may be extracted as the keyword of the text information.

When the keyword of the text information is extracted, the step of deriving information required for retrieval on the basis of the keyword may be performed. The step of deriving information required for retrieval may include extracting information about at least one of utterance intent, purpose, and target of an utterer based on the keyword. In the present embodiment, the information required for retrieval may be derived in such a manner that the utterance intent of the utterer is a question, the utterance purpose is retrieval of the information, and the utterance target is A.

When the information required for retrieval is derived, retrieval of A may be performed. The screen for the website retrieval result may be displayed on the display unit 130. This screen may be provided in the form of a text or an image, or a combination thereof.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method for analyzing an utterance meaning, the method comprising:
   selecting an operation mode from a plurality of operation modes, wherein the selected operation mode is for analyzing a topic and meaning of an event based on the utterance meaning of users in the event;
   setting a topic keyword having a range of preset topic keywords;
   identifying a main utterance topic based on the topic keyword by
      collecting a voice signal of an utterer using a voice sensor,
      converting, by a controller, the collected voice signal into a single text information in a text form, wherein the controller includes at least one integrated circuit,
      extracting, by the controller, a plurality of keywords of the single text information from the single text information,
      deriving, by the controller, the main utterance topic based on the extracted plurality of keywords of the single text information, wherein the main utterance topic is selected based on the range of preset topic keyword of the set topic keyword;
   analyzing, by the controller, the utterance meaning based on the derived main utterance topic, wherein analyzing the utterance meaning comprises
      collecting a further voice signal of the utterer using the voice sensor,
      extracting a further keyword by converting the collected further voice signal into a text form,
      deriving a range of derived utterance topics based on the main utterance topic and the further keyword,
      deriving a detailed utterance topic within the range of derived utterance topics, and
      generating a tree according to the detailed utterance topic; and
   displaying content on the generated tree, and for each detailed utterance topic displaying a main content of subsequent utterances in the order of utterances of the utterer in real time.

2. The method according to claim 1, wherein the main utterance topic is derived based on extracted plurality of keywords of the single text information emerging at a preset reference value or higher among the keywords of the text information.

3. The method according to claim 1, wherein deriving the main utterance topic further comprises deriving a plurality of utterance topics and then deriving a selected utterance topic based on a selection by a user from the utterance topics derived based on the extracted plurality of keywords.

4. The method according to claim 1, wherein deriving the main utterance topic further comprises deriving an utterance topic based on a correlation between the extracted plurality of keywords.

5. The method according to claim 1, wherein deriving the main utterance topic further comprises deriving an utterance topic based on information about the utterer.

6. The method according to claim 1, wherein collecting the voice signal comprises collecting a voice signal from a plurality of utterers and wherein deriving the main utterance topic comprises deriving an utterance topic based on common information about the utterers.

7. The method according to claim 1, wherein deriving the main utterance topic further comprises deriving an utterance topic selected at a preset reference value or higher based on a history of selecting utterance topics.

8. The method according to claim 1, wherein deriving the main utterance topic comprises extracting information about utterance intent, purpose, or target of the utterer based on the extracted plurality of keywords of the single text information, and deriving an utterance topic based on the extracted information.

9. The method according to claim 1, wherein deriving the main utterance topic comprises deriving an utterance topic based on a result of analyzing the utterance meaning.

10. An apparatus for analyzing an utterance meaning comprising:
    a collection unit configured to collect a voice signal of an utterer;
    a display; and
    a controller implemented using at least on integrated circuit;
    a memory storing a program to be executed in the controller, the program comprising instructions to
       select an operation mode from a plurality of operation modes, wherein the selected operation mode is for analyzing a topic and meaning of an event based on the utterance meaning of users in the event;
       set a topic keyword having a range of preset topic keywords;
       identify a main utterance topic based on the topic keyword by
          receive a voice signal of the utterer from the voice sensor,
          convert the collected voice signal into a single text information in a text form,
          extract a plurality of keywords of the single text information from the single text information,
          derive the main utterance topic based on the extracted plurality of keywords of the single text information, wherein the main utterance topic is selected based on the range of preset topic keyword of the set topic keyword;

analyze the utterance meaning based on the derived main utterance topic by
receive a further voice signal of the utterer from the voice sensor,
extract a further keyword by converting the collected further voice signal into a text form,
derive a range of derived utterance topics based on the main utterance topic and the further keyword,
derive a detailed utterance topic within the range of derived utterance topics, and
generate a tree according to the detailed utterance topic; and
provide a content on the generated tree to the display, and for each detailed utterance topic provide a main content of subsequent utterances in the order of utterances of the utterer in real time.

11. The apparatus according to claim 10, wherein the program comprises further instructions to cause the controller to derive the main utterance topic based on the extracted plurality of keywords of the single text information output above a preset reference value among the extracted plurality of keywords of the single text information.

12. The apparatus according to claim 10, wherein the program comprises further instructions to cause the controller to derive the main utterance topic based on a selection, by a user, from the utterance topics derived based on the extracted plurality of keywords.

13. The apparatus according to claim 10, wherein the program comprises further instructions to cause the controller to derive the main utterance topic based on a correlation between the extracted plurality of keywords.

14. The apparatus according to claim 10, wherein the program comprises further instructions to cause the controller to derive the main utterance topic based on information about the utterer.

15. The apparatus according to claim 10, wherein the voice signal comprises a voice signal of a plurality of utterers, and wherein the controller is configured to derive the main utterance topic based on common information about the utterers.

16. The apparatus according to claim 10, wherein the program comprises further instructions to cause the controller to derive, as the main utterance topic of the utterer, an utterance topic selected at a preset reference value or higher based on a history of selecting the utterance topic.

17. The apparatus according to claim 10, wherein the program comprises further instructions to cause the controller to extract information about an utterance intent, purpose, or target of the utterer based on the keywords, and to derive an utterance topic based on the extracted information.

18. The apparatus according to claim 10, wherein the program comprises further instructions to cause the controller to derive the main utterance topic based on a result of analyzing the utterance meaning.

19. The apparatus according to claim 10, wherein the display is configured to enable the utterer to check display content of the display.

20. The method according to claim 1, further comprising receiving a command using a hardware input device, the hardware input device comprising a device selected from the group consisting of a button, a switch, a keyboard, a mouse, a track-ball, and a touch pad.

21. The method according to claim 1, wherein the displaying comprises displaying an image or a moving picture on a screen.

22. The method according to claim 1, wherein collecting the voice signal using the voice sensor comprises collecting the voice signal using a microphone, a piezoelectricsensor, or an acoustic differential sensor.

23. The apparatus according to claim 10, wherein the collection unit comprises a microphone, a piezoelectric sensor, or an acoustic differential sensor.

24. The apparatus according to claim 10, wherein the display comprises a screen configured to display an image or a moving picture indicative of the derived utterance topic.

25. The apparatus according to claim 10, further comprising a hardware input device configured to receive a user command.

26. The apparatus according to claim 25, wherein the hardware input device comprises a device selected from the group consisting of a button, a switch, a keyboard, a mouse, a track-ball, and a touch pad.

* * * * *